Dec. 29, 1925.
L. S. WOODHULL
1,567,481
STEAM TRAP
Filed Nov. 26, 1923    2 Sheets-Sheet 1
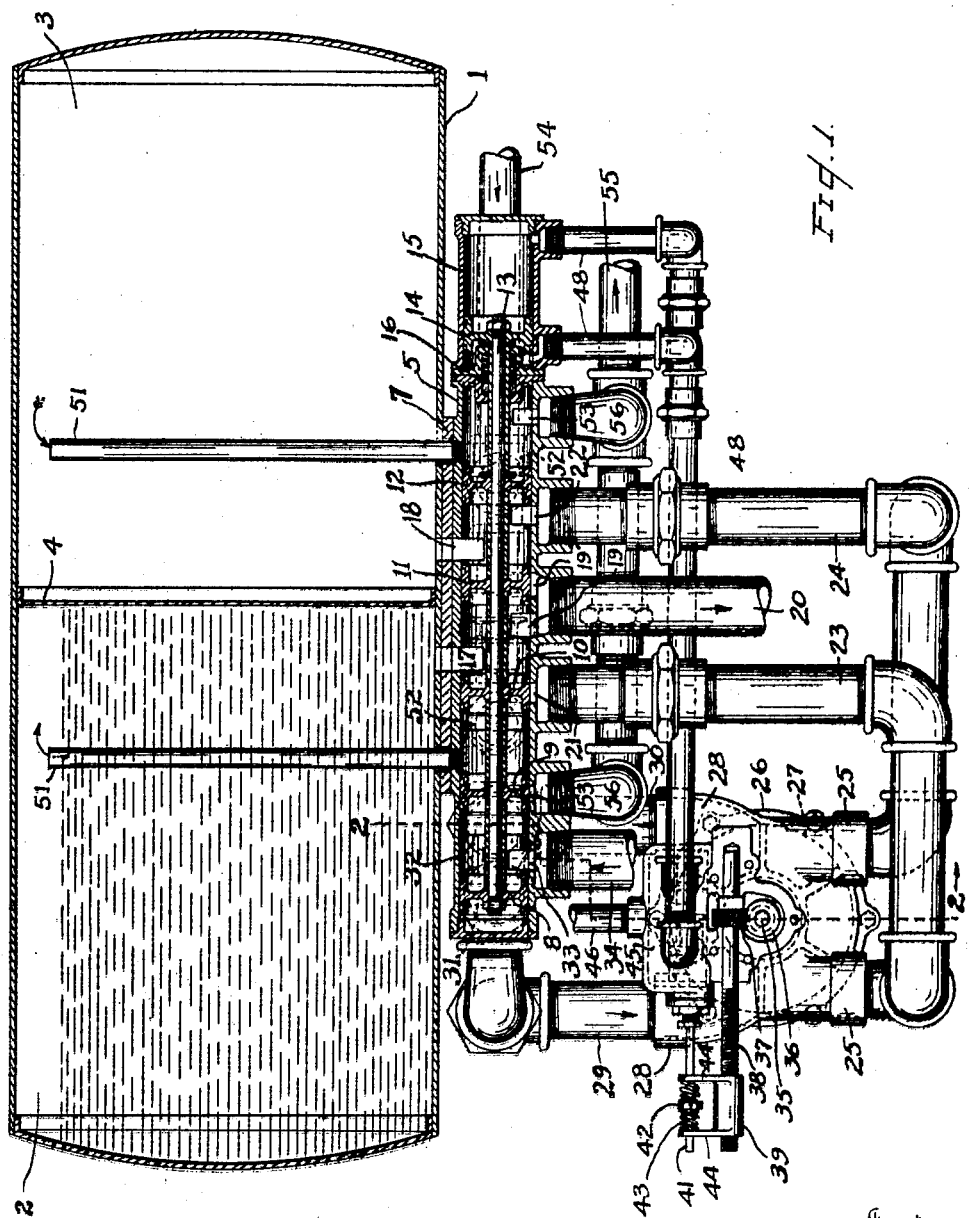
Inventor
Llewellyn S. Woodhull
By
Attorney

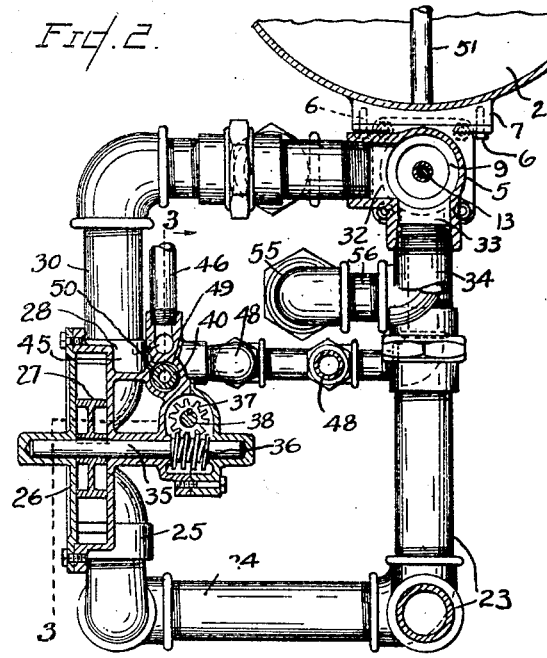

Patented Dec. 29, 1925.

1,567,481

UNITED STATES PATENT OFFICE.

LLEWELLYN S. WOODHULL, OF DETROIT, MICHIGAN.

STEAM TRAP.

Application filed November 26, 1923. Serial No. 676,916.

*To all whom it may concern:*

Be it known that I, LLEWELLYN S. WOODHULL, a citizen of the United States, residing at Detroit, in the county of Wayne and State of Michigan, have invented a new and useful Steam Trap, of which the following is a specification.

This invention relates to steam traps, and relates more particularly to steam traps adapted to continuously deliver water of condensation from a steam line into a boiler or other container.

It is an object of the invention to provide a steam trap using no tilting chambers, no float valves, and no rotary valves.

Tilting chamber traps are usually more expensive to make than those in which a stationary chamber is used and the wear incident to the tilting movement is objectionable. Float controlled valves are likely to get out of order. Rotary valves are more likely to leak than those of a piston type, particularly when controlling the flow of steam.

A further object of the invention is to control the valves of a steam trap by the pressure of water flowing to the trap.

Another object is to provide a double chamber type of steam trap controlling the delivery and discharge both of water and steam to and from the chambers of the trap by a series of piston valves actuated in common and disposed within a common cylinder.

In attaining this object the invention contemplates providing a steam trap having adjacent chambers into one of which water of condensation from the pipe (or system of pipes) controlled by the trap is being delivered while steam under pressure is admitted to the other chamber to force previously admitted water of condensation therefrom to any desired point of delivery, as for example into the boiler delivering steam to the system controlled by the trap, piston valves being arranged to reciprocate as a unit to control the steam and water passages to said chambers, and a water wheel (or its equivalent) being actuated by the water flowing to said chambers and effecting a gradual travel of a valve which in limiting positions reverses the application of pressure to the unitary piston valves which are then shifted to reverse the water and steam passages to the two chambers, and to further reverse the direction of impact of the water against said wheel.

A preferred embodiment of the invention is hereinafter described and illustrated in the accompanying drawings, wherein, Fig. 1 is a view in sectional elevation of the improved steam trap.

Fig. 2 is a cross-section view taken on line 2—2 of Fig. 1, showing primarily the common automatic control means for the water and steam passages.

Fig. 3 is a vertical section on line 3—3 of Fig. 2, showing a wheel driven by the water flowing to the chambers of the trap and a reciprocatory steam valve controlled by said wheel.

Fig. 4 is a bottom plan view of the invention.

In these views the reference character 1 designates a horizontal cylindrical tank, in which chambers 2 and 3 are formed by a central partition 4. 5 is a piston valve cylinder extending longitudinally of the tank 1, therebeneath, and suitably secured to the tank, as for example by bolts 6 engaging a mounting plate 7 upon the bottom of the tank. In the cylinder 5, piston valves 8, 9, 10, 11 and 12 are connected by a rod 13 for reciprocation in unison. For actuating said valves, a piston 14 is secured to one end of the rod 13, said piston working within a steam pressure cylinder 15 secured to one end of the cylinder 5, the rod 13 passing through a packed slide bearing 16 between the cylinders 5 and 15. 17 and 18 are ports opening from the chambers 2 and 3, adjacent the partition 4, into the cylinder 5, and 19 and 19' designate two adjacent ports opening from said cylinder between the ports 17 and 18, and both communicating with a pipe 20. The valves 10 and 11 control the ports 19 and 19'. Thus in the position of said pistons illustrated in Fig. 1, the port 19' is closed by the piston 11, while between said pistons there is formed a water discharge passage from the port 17 to the port 19. When the pistons are shifted to their other limiting position, the port 19 will be closed by the piston 10 and water may flow between said pistons from the port 18 to the port 19'. 21 and 22 designate two ports in the cylinder 5 also controlled by the valves 10 and 11, and located at opposite sides of the ports 17 and 18. The ports 21 and 22 communicate with water pipes 23 and 24 which lead from tangential outlets 25 of the casing 26 of a water-wheel 27. Opposed to said outlets are inlets 28 in said casing with which connect water pipes 29 and 30, leading respectively to ports 31 and 32 in the cylinder 5. The valve 8 reciprocates between positions respectively closing said ports 31 and 32, and thus controls communication with said ports of an intermediate port 33, to which a water supply pipe 34 leads.

The shaft 35 of the water-wheel 27 carries a worm 36, driving a worm-wheel 37, fast upon a shaft 38 having a screw-threaded portion forming a feed-screw for a nut 39. As is best seen in Fig. 3, said nut is an actuating element for a tubular slide valve 40, the stem 41 of said valve having a collar 42 fast thereupon, and springs 43 being coiled between said collar and a pair of arms 44 projecting integrally from the extremities of said nut. Said springs provide for a lost-motion travel of said nut relative to the stem 41 for a purpose hereinafter set forth. The valve 40 works within a casing 45 having the steam inlet 46 and having two steam outlet ports 47 and 47' alternately opened and closed by the valve 40, according as the latter is in one or the other of its limiting positions. Two pipes 48 are connected with the ports 47 and 47' and lead to opposite ends of the pressure cylinder 15. The central portion of the tubular valve 40 is annularly channeled, as indicated at 49, forming a steam passage which in all positions of said valve communicates with an exhaust port 50, which, as is shown in Fig. 2, may open to the atmosphere. Just prior to uncovering either port 47 or 47' the valve 40 places the other of said ports in communication with the exhaust port 50 through the annular passage 49.

Within each chamber 2 and 3, a steam pipe 51 rises, opening above the maximum water level in said chambers. Said pipes, at their lower ends, communicate with the cylinder 5, and a steam inlet port 52 and exhaust port 53 are formed in said cylinder at opposite sides of each pipe 51. 54 is a live steam supply pipe leading to the two ports 52, and 55 is an exhaust steam pipe having branches 56 leading from the two ports 53. The piston 9 controls the ports 52 and 53 for delivery and exhaust of steam to and from the chamber 2, and the piston 12 controls the ports 52 and 53 through which steam passes to and from the chamber 3.

Considering now the operation of the described invention, it is to be understood that the set of valves 8, 9, 10, 11 and 12 are shifted to one or the other of their limiting positions, according as steam is admitted to the cylinder 15 through one or the other of the pipes 48. In the position of said valves shown in Fig. 1, the port 17 communicates through the cylinder 5 with the pipe 20, thus providing for a discharge of water from the chamber 2 into said pipe. The steam inlet port 52 below the chamber 2 is uncovered as is likewise the steam exhaust port 53 below the chamber 3. Consequently live steam is being delivered from the pipe 54 by way of the port 52 and pipe 51 into the chamber 2 to displace the water therefrom. The water inlet port 21 is covered by the valve 10, while the valve 12 is clear of its port 22. Consequently water is flowing into the chamber 3 from the pipe 24 by way of the ports 22 and 18. Steam in the chamber 3 is being displaced by the inflowing water and discharges by way of the pipe 51 and port 53 below said chamber into the exhaust steam pipe 55. The piston 8 covers the port 31 and uncovers the port 32. The water of condensation, therefore, which the pipe 34 delivers, flows by way of the ports 33 and 32, and the pipe 30 to the casing 26, actuating the water wheel 27 in the direction of the arrow in Fig. 1, and flowing from said casing through the pipe 24 to the chamber 3. The worm 36, worm-wheel 37 and screw 38 form a speed reduction mechanism actuated by said water-wheel and effecting a gradual travel of the nut 39 to the right. (Fig. 1.) The speed ratio between the rotation of the water-wheel and the resulting travel of the nut 39 is such that when sufficient water has flowed past said wheel to establish a predetermined level in the chamber 2 or 3 receiving such flow, as for example the level shown in Fig. 1, the rotative travel of the water-wheel produced by said flow will have actuated the nut 39 and master valve 40 between the limits of their travel. The ports 47 and 47' are respectively uncovered by the valve 40 in its respective limiting positions. Thus, as shown in Fig. 3, the nut 39 has just completed its travel away from valve casing 45, and has established the disclosed limiting position of the valve 40, uncovering the port 47. Steam is therefore flowing through the casing 45 from the inlet pipe 46 to said port, and thence through the corresponding pipe 48 to the right-hand end of the cylinder 15 (see Fig. 1). Consequently, as shown in said figure, the valves 8, 9, 10, 11, and 12 have been shifted to their left-hand limiting position. Said valves will maintain this position until sufficient water has flowed through the pipe 24 into chamber 3 to establish therein a maximum level, the chamber 2 in the meantime having been substantially emptied. When said level has been reached, the water-wheel 27 will have been rotatively driven sufficiently to shift the nut 39 to the limit of its travel toward the casing 45, this limit being established upon arrival of the valve 40 at the opposite limit to that shown in Fig. 3. In arriving at said limit the valve will uncover the port 47' and steam will be admitted to the left-hand end of the cylinder 15 (Fig. 1), whereupon the valves 8, 9, 10, 11 and 12 will be actuated to their opposite limit to that shown in Fig. 1. This will permit the chamber 2 to fill with water while the chamber 3 empties, will admit steam to the latter chamber while providing for exhaust of steam from the former, and will reverse the direction of rotation of the water-wheel 27 and of travel of the nut 39 and valve 40. By repetition of the described cycle, a continuous flow of water through the pipe 20 under live steam pressure is maintained. By location of the described trap a short distance above the normal water level in the boiler supplying the steam system (not shown) which is drained by the pipe 34 it is made possible to discharge the water from the pipe 20 back to said boiler.

The springs 43 permit the valve 40 to remain stationary during a considerable portion of the travel of the nut 39 in either direction, one or other of said springs being compressed during such travel. When this compression becomes sufficient to overcome frictional resistance offered by the valve 40, the sudden expansion of the spring acts to effect a quick travel of the valve to its other limiting position. Furthermore, said springs permit the water-wheel 27 to acquire a slight momentum, subsequent to reversal of its travel, before being placed under load of its work.

Just before the valve 40 uncovers either port 47 or 47', the other of said ports establishes communication with the annular passage 49 and through the latter with the exhaust port 50, and this communication is maintained during the open period of the first-mentioned port. Thus, it is assured that the exhaust steam may discharge from one end of the cylinder 15 while being admitted to the other end thereof.

The described steam trap avoids objectionable tilting parts and also avoids rotary valves and the difficulties encountered in keeping the same properly packed. The automatic control mechanism is furthermore one that will not readily get out of order.

What I claim is:

1. A steam trap comprising a chamber, means for delivering water of condensation to and for withdrawing it from said chamber, means for delivering steam to and for withdrawing it from said chamber, a piston valve directly controlling the water delivery and withdrawal, a piston valve directly controlling the steam delivery and withdrawal, a common cylindrical casing in which said valves are mounted, means connecting said valves for reciprocation in unison, and means exterior to said chamber controlling the travel of said valves.

2. A steam trap comprising a chamber, means for delivering water of condensation to and for withdrawing it from said chamber, means for delivering steam to and for withdrawing it from said chamber, valves controlling the steam and water delivery and withdrawal, means for applying steam pressure to effect travel of said valves, a valve controlling steam delivery to the last-named means, and automatic control means for said valve, exterior to said chamber.

3. A steam trap comprising a chamber, connections for the delivery and withdrawal of water to and from said chamber, means for delivering steam to and withdrawing it from said chamber, and a control element for the steam and water connections to said chamber arranged in one of said water connections and actuable by the flow of water therethrough.

4. A steam trap comprising a chamber, connections for delivering water of condensation to and withdrawing it from said chamber, connections for delivering steam to and withdrawing it from said chamber, valves controlling said connections, means for applying fluid pressure to actuate said valves, a master valve controlling the delivery of fluid to the last-named means, a water-wheel actuable by the flow in one of said water connections, and speed reduction mechanism driven by said water-wheel and actuating said master valve.

5. A steam trap comprising adjacent chambers, means for alternately delivering water to said chambers, means for delivering steam to each chamber in alternation with the delivery of water thereto for expelling the water, fluid actuable control means for the water and steam, a valve controlling the application of fluid pressure to said control means, and automatic control means for said valve, exterior to said chambers.

6. In a steam trap, a control valve, a hydraulically actuable element, a speed reduction mechanism establishing an actuating connection from said element to said valve, a chamber for the accumulation of water preliminary to its delivery to a boiler, and means for delivering water, first to said hydraulically actuable element to drive the same, and subsequently to said chamber.

7. A steam trap comprising adjacent chambers, means for alternately delivering water to said chambers, a control element exterior to said chambers and movable under pressure of the water flowing to said chambers and valves under control of said element, exercising control of the alternating flow to said chambers, and reversing the effective application of pressure to said element upon each alternation of flow to said chambers.

8. A steam trap comprising adjacent chambers, means for alternately delivering water to said chambers, piston valves controlling such delivery, means for applying fluid to actuate said valves, a master valve controlling the application of such fluid, a member movable under pressure of the water flowing to said chambers, and speed reduction mechanism actuating said master valve from said member.

9. A steam trap comprising adjacent chambers, pipes for delivering water alternately to said chambers and for withdrawing it therefrom, a casing connected with the water delivery pipes of both chambers, a water-wheel in said casing adapted to be driven in opposite directions according as water is delivered through one or the other of said pipes, valves controlling the water flow to and from said chambers, actuating means for said valves, speed reduction mechanism driven by said water-wheel, and an element movable through said mechanism controlling actuation of said valves.

10. A steam trap comprising adjacent chambers, pipes for delivering water alternately to said chambers and for withdrawing it therefrom, a casing connected with the water delivery pipes of both chambers, a water wheel in said casing adapted to be driven opposite directions according as water is delivered through one or the other of said delivery pipes, valves controlling the water flow to and from said chambers, actuating means for said valves, a control member for said means, speed reduction mechanism driven by the water-wheel, and means effecting a quick shifting of said control member in certain limiting positions of the reduction mechanism.

11. A steam trap comprising adjacent chambers, pipes for delivering water alternately to said chambers and for withdrawing it therefrom, pipes for delivering steam to said chambers to expel the water therefrom, and for withdrawing the steam, a set of valves reciprocatory as a unit controlling the water and steam supply to and discharge from said chamber, means for applying fluid pressure to reciprocate said valves, and means for periodically automatically reversing the application of such pressure.

12. A steam trap comprising a chamber, a water supply connection leading to said chamber, a water discharge connection leading from said chamber, a steam supply connection leading to said chamber, a steam discharge connection leading from said chamber, the junctures of said connections with said chamber being adjacent and means for controlling said connections in common located exteriorly of said chamber and substantially at the juncture of said connections with said chamber.

13. A steam trap comprising a chamber, means for delivering water to and withdrawing it from said chamber, means for delivering steam to and withdrawing it from said chamber, means for applying steam to control the water and steam connections to said chamber in common, and hydraulic means arranged exteriorly to said chamber controlling such application of steam.

14. In a steam trap, a control valve, a rotor, a speed reduction mechanism establishing an actuating connection from said rotor to said valve, a chamber for the accumulation of water, preliminary to its delivery to a boiler, and means for delivering water first to said rotor to drive the same, and subsequently to said chamber.

15. A steam trap comprising a chamber, connections for the delivery and withdrawal of water to and from said chamber, means for delivering steam to and withdrawing it from said chamber, valves controlling said water and steam connections, means for applying fluid to actuate said valves in common, a master valve controlling the application of such fluid, an actuating element for the master valve, and control means for said actuating element connected to said steam and water control valves for actuation in common therewith.

In testimony whereof I sign this specification.

LLEWELLYN S. WOODHULL.